United States Patent
Iwata et al.

(10) Patent No.: US 11,800,321 B2
(45) Date of Patent: Oct. 24, 2023

(54) SERVER AND COMMUNICATION SYSTEM

(71) Applicant: CLARION CO., LTD., Saitama (JP)

(72) Inventors: Yumi Iwata, Saitama (JP); Takashi Yamaguchi, Saitama (JP)

(73) Assignee: CLARION CO., LTD., Saitama (JP)

( * ) Notice: Subject to any disclaimer, the term of this patent is extended or adjusted under 35 U.S.C. 154(b) by 490 days.

(21) Appl. No.: 17/045,651

(22) PCT Filed: Feb. 27, 2019

(86) PCT No.: PCT/JP2019/007654
§ 371 (c)(1),
(2) Date: Oct. 6, 2020

(87) PCT Pub. No.: WO2019/198366
PCT Pub. Date: Oct. 17, 2019

(65) Prior Publication Data
US 2021/0136528 A1 May 6, 2021

(30) Foreign Application Priority Data

Apr. 11, 2018 (JP) .................. 2018-076097

(51) Int. Cl.
*H04W 4/029* (2018.01)
*G01C 21/26* (2006.01)
(Continued)

(52) U.S. Cl.
CPC ............ *H04W 4/029* (2018.02); *G01C 21/26* (2013.01); *G08B 25/04* (2013.01); *G08B 25/10* (2013.01); *G08G 1/09* (2013.01)

(58) Field of Classification Search
CPC ... H04W 12/068; H04W 4/024; H04W 12/04; H04W 36/32; H04W 36/38; H04W 4/40;
(Continued)

(56) References Cited

U.S. PATENT DOCUMENTS 7,149,502 B2 * 12/2006 Fujisawa ............... H04W 4/024
455/457
7,869,392 B2 * 1/2011 Sabo .................... H04L 12/2803
370/465
(Continued)

FOREIGN PATENT DOCUMENTS

JP   2004-222155 A   8/2004
JP   2004-364223 A   12/2004
(Continued)

OTHER PUBLICATIONS

Japanese Office Action mailed by Japanese Patent Office dated Mar. 15, 2022 in corresponding Japanese patent application No. 2018-076097.
(Continued)

*Primary Examiner* — Joseph Arevalo
(74) *Attorney, Agent, or Firm* — IP BUSINESS SOLUTIONS, LLC (57) ABSTRACT

Highly precise detection of occurrence of an abnormality in an out-of-service area is enabled. A server 5 includes an area identification unit 24A identifying an out-of-service area in which communication with an information communication device 3 is disabled, a determination unit 24B determining whether the information communication device 3 enters the out-of-service area or not by using the position information of the information communication device 3, a computation unit 24C calculating an expected stay time in which the information communication device 3 stays in the out-of-service area, and a notification control unit 24D executing notification processing for notifying predetermined information to a notification destination if it is determined that the information communication device 3 enters the out-of-service area and when an elapsed time from a time when
(Continued)

communication with the information communication device 3 is disabled exceeds the expected stay time.

10 Claims, 6 Drawing Sheets

(51) Int. Cl.
  *G08B 25/04* (2006.01)
  *G08B 25/10* (2006.01)
  *G08G 1/09* (2006.01)

(58) Field of Classification Search
  CPC ..... H04W 12/041; H04W 4/02; H04W 4/029; H04W 4/06; H04W 4/44; H04W 48/10; H04W 8/18
  USPC ...... 455/456.1, 436, 414.1, 457, 456.5, 522, 455/419, 422.1, 3.02, 432.1, 433
  See application file for complete search history.

(56) References Cited

U.S. PATENT DOCUMENTS

| | | | | |
|---|---|---|---|---|
| 9,635,502 | B2* | 4/2017 | Pietraniec | H04W 4/029 |
| 9,940,813 | B2* | 4/2018 | Nishikawa | G08B 21/18 |
| 2006/0211440 | A1* | 9/2006 | Nomiya | H04W 16/06 |
| | | | | 455/522 |
| 2007/0060126 | A1* | 3/2007 | Taniguchi | H04W 36/32 |
| | | | | 455/436 |
| 2010/0085904 | A1 | 4/2010 | Hamaue et al. | |
| 2010/0277367 | A1* | 11/2010 | Dicke | G01S 19/24 |
| | | | | 715/764 |
| 2011/0210835 | A1 | 9/2011 | Kondo | |
| 2013/0137422 | A1* | 5/2013 | Sugitani | H04W 52/028 |
| | | | | 455/574 |
| 2013/0173346 | A1* | 7/2013 | Odawara | G06Q 50/26 |
| | | | | 705/7.34 |
| 2013/0190032 | A1* | 7/2013 | Li | H04L 67/56 |
| | | | | 455/517 |
| 2013/0262668 | A1* | 10/2013 | Shiga | H04W 12/37 |
| | | | | 709/224 |
| 2013/0335204 | A1* | 12/2013 | Marshall | G05B 19/02 |
| | | | | 340/12.5 |
| 2014/0171041 | A1* | 6/2014 | Akizuki | H04W 76/20 |
| | | | | 455/414.1 |
| 2016/0192153 | A1* | 6/2016 | Namba | H04W 4/026 |
| | | | | 455/456.1 |
| 2016/0322078 | A1* | 11/2016 | Bose | G01P 13/00 |
| 2017/0034654 | A1* | 2/2017 | Oberbeck | H04N 21/6405 |
| 2017/0108345 | A1* | 4/2017 | Arakawa | G01C 21/343 |
| 2017/0262697 | A1* | 9/2017 | Kaps | G11B 27/022 |
| 2018/0070273 | A1* | 3/2018 | Sleight | H04L 65/1095 |
| 2018/0218629 | A1* | 8/2018 | Shimada | G09B 7/10 |
| 2019/0170522 | A1* | 6/2019 | Matsunaga | G08G 1/096827 |
| 2020/0006988 | A1* | 1/2020 | Leabman | H02J 50/60 |
| 2021/0136528 | A1* | 5/2021 | Iwata | H04W 4/44 |

FOREIGN PATENT DOCUMENTS

| | | |
|---|---|---|
| JP | 2005147992 A | 6/2005 |
| JP | 2007333586 A | 12/2007 |
| JP | 2008107995 A | 5/2008 |
| JP | 2010-177851 A | 8/2010 |
| JP | 2010-205063 A | 9/2010 |
| JP | 2011-119784 A | 6/2011 |
| JP | 2011-204232 A | 10/2011 |
| JP | 2016200907 A | 12/2016 |
| JP | 2017-004560 A | 1/2017 |

OTHER PUBLICATIONS

Extended European Search Report mailed by European Patent Office dated Dec. 14, 2021 in corresponding European patent application No. 19785122.3-1213.
International Preliminary Report on Patentability of PCT Application No. PCT/JP2019/007654 dated Oct. 22, 2020.
Written Opinion of the International Searching Authority of PCT Application No. PCT/JP2019/007654 dated May 7, 2019.
International Search Report of PCT/JP2019/007654 dated May 7, 2019.
Written Opinion of the International Searching Authority of PCT/JP2019/007654 dated May 7, 2019.
European Office Action dated Feb. 14, 2023 in corresponding European patent application No. 19785122.3.-1213.
European Office Action mailed by European Patent Office dated Aug. 23, 2023 in corresponding European patent application No. 19 785 122.3-1213.

* cited by examiner

| IDENTIFICATION ID | TIME | VEHICLE SPEED | LATITUDE | LONGITUDE |
|---|---|---|---|---|
| VEHICLE-MOUNTED DEVICE A | 15:06 | 94Km/h | 35.65447177 | 139.74587917 |
| VEHICLE-MOUNTED DEVICE A | 15:07 | 100Km/h | 35.65447181 | 139.74587911 |
| VEHICLE-MOUNTED DEVICE A | 15:08 | 97Km/h | 35.65447189 | 139.74587919 |
| VEHICLE-MOUNTED DEVICE C | 15:08 | 0Km/h | 35.77068096 | 139.73626614 |
| VEHICLE-MOUNTED DEVICE A | 15:09 | 96Km/h | 35.65447193 | 139.74587926 |
| VEHICLE-MOUNTED DEVICE C | 15:09 | 0Km/h | 35.77068096 | 139.73626614 |
| VEHICLE-MOUNTED DEVICE A | 15:10 | 83Km/h | 35.65447201 | 139.74587921 |
| VEHICLE-MOUNTED DEVICE B | 15:10 | 0Km/h | 35.64603261 | 139.85844612 |
| VEHICLE-MOUNTED DEVICE C | 15:10 | 0Km/h | 35.77068096 | 139.73626614 |
| VEHICLE-MOUNTED DEVICE A | 15:11 | 52Km/h | 35.65447201 | 139.74587934 |
| VEHICLE-MOUNTED DEVICE B | 15:11 | 12Km/h | 35.64603269 | 139.85844612 |
| VEHICLE-MOUNTED DEVICE C | 15:11 | 40Km/h | 35.77068102 | 139.73626611 |
| VEHICLE-MOUNTED DEVICE A | 15:12 | 0Km/h | 35.65447243 | 139.74587934 |
| VEHICLE-MOUNTED DEVICE B | 15:12 | 65Km/h | 35.64603298 | 139.85844682 |
| VEHICLE-MOUNTED DEVICE C | 15:12 | 89Km/h | 35.77068152 | 139.73626616 |
| VEHICLE-MOUNTED DEVICE A | 15:13 | 0Km/h | 35.65447243 | 139.74587934 |
| VEHICLE-MOUNTED DEVICE B | 15:13 | 61Km/h | 35.64603333 | 139.85844598 |
| VEHICLE-MOUNTED DEVICE C | 15:13 | 74Km/h | 35.77068207 | 139.73626575 |

FIG.3

| IDENTIFICATION ID | ACC ON TIME | ACC OFF TIME |
|---|---|---|
| VEHICLE-MOUNTED DEVICE A | 9/27/2017 15:00 | 9/26/2017 17:00 |
| VEHICLE-MOUNTED DEVICE B | 9/27/2017 15:10 | 9/27/2017 10:00 |
| VEHICLE-MOUNTED DEVICE C | 9/27/2017 15:08 | 9/26/2017 17:30 |
| VEHICLE-MOUNTED DEVICE D | 9/25/2017 14:15 | 9/25/2017 17:45 |

FIG.4

| IDENTIFICATION ID | CONTACT | TELEPHONE NUMBER |
|---|---|---|
| VEHICLE-MOUNTED DEVICE A | vehicle-A@***.co.jp | 090--*1 |
| VEHICLE-MOUNTED DEVICE B | vehicle-B@***.co.jp | 090--*2 |
| VEHICLE-MOUNTED DEVICE C | vehicle-C@***.co.jp | 090--*3 |
| VEHICLE-MOUNTED DEVICE D | vehicle-D@***.co.jp | 090--*4 |

FIG.5

SERVER AND COMMUNICATION SYSTEM

TECHNICAL FIELD

The present invention relates to a server that can communicate with an information communication device and a communication system including the server.

BACKGROUND ART

Patent Literature 1 discloses a failure notifying device that determines a failure state of a mobile communication terminal based on a fact that the mobile communication terminal currently cannot perform communication and that the mobile communication terminal was able to perform communication at the same position in the past and causes a display part to notify that there is a high possibility of a failure.

CITATION LIST

Patent Literature

Patent Literature 1: Japanese Patent Laid-Open No. 2004-222155

SUMMARY OF INVENTION

Technical Problem

However, because the conventional configuration is a technology that detects a failure at a location where the mobile communication terminal was able to perform communication in the past, a failure or a movement in an out-of-service area without communication facility or the like cannot be detected.

Accordingly, it is an object of the present invention to enable highly precise detection of occurrence of an abnormality in an out-of-service area.

Solution to Problem

This specification incorporates the entirety of Japanese Patent Application No. 2018-076097 filed Apr. 11, 2018.

In order to achieve the object, a server having an information acquisition unit acquiring position information of an information communication device at time intervals through communication with the information communication device includes an area identification unit identifying an out-of-service area in which communication with the information communication device is disabled, a determination unit determining whether the information communication device enters the out-of-service area or not by using the position information, a computation unit calculating an expected stay time in which the information communication device stays in the out-of-service area, and a notification control unit executing notification processing for notifying predetermined information to a notification destination if it is determined that the information communication device enters the out-of-service area and when an elapsed time from a time when communication with the information communication device is disabled exceeds the expected stay time.

In the configuration, the area identification unit identifies an out-of-service area through which the information communication device passes by using the position information and by using area information from which the out-of-service area can be identified and information from which a movement plan route of the information communication device can be identified.

In the configuration, the notification control unit performs notification processing for confirming a situation of a monitoring target person moving along with the information communication device if the elapsed time exceeds the expected stay time.

In the configuration, the computation unit calculates the expected stay time based on at least one of acquired position history of the information communication device and a movement plan of the information communication device.

In the configuration, the server further includes a traffic information acquisition unit acquiring traffic information including a traffic jam, and the computation unit sets the expected stay time as a time reflecting the traffic information.

In the configuration, the information acquisition unit further acquires information indicating whether a mobile unit moving along with the information communication device is in a use state or not, and the notification control unit does not execute the notification processing if it is regarded, based on the information indicating whether the mobile unit is in a use state or not, that the mobile unit is in a nonuse state.

Also, in a communication system including an information communication device and a server having an information acquisition unit acquiring position information of the information communication device at time intervals through communication with the information communication device, the server includes an area identification unit identifying an out-of-service area in which communication with the information communication device is disabled, a determination unit determining whether the information communication device enters the out-of-service area or not by using the position information, a computation unit calculating an expected stay time in which the information communication device stays in the out-of-service area, and a notification control unit executing notification processing for notifying predetermined information to a notification destination if it is determined that the information communication device enters the out-of-service area and when an elapsed time from a time when communication with the information communication device is disabled exceeds the expected stay time.

In the configuration, the area identification unit identifies an out-of-service area through which the information communication device passes by using the position information and by using area information from which the out-of-service area can be identified and information from which a movement plan route of the information communication device can be identified.

In the configuration, the notification control unit performs notification processing for confirming a situation of a monitoring target person moving along with the information communication device if the elapsed time exceeds the expected stay time.

In the configuration, the computation unit calculates the expected stay time based on at least one of acquired position history of the information communication device and a movement plan of the information communication device.

In the configuration, the server further includes a traffic information acquisition unit acquiring traffic information including a traffic jam, and the computation unit sets the expected stay time as a time reflecting the traffic information.

In the configuration, the information acquisition unit further acquires information indicating whether a mobile unit moving along with the information communication device is in a use state or not, and the notification control unit does not execute the notification processing if it is regarded, based on the information indicating whether the mobile unit is in a use state or not, that the mobile unit is in a nonuse state.

Advantageous Effect of Invention

Because an aspect of the present invention includes an area identification unit identifying an out-of-service area in which communication with an information communication device is disabled, a determination unit determining whether the information communication device enters the out-of-service area or not by using position information of the information communication device, a computation unit calculating an expected stay time in which the information communication device stays in the out-of-service area, and a notification control unit executing notification processing for notifying predetermined information to a notification destination if it is determined that the information communication device enters the out-of-service area and when an elapsed time from a time when communication with the information communication device is disabled exceeds the expected stay time, occurrence of an abnormality in the out-of-service area can be detected with high precision, and notification to the notification destination is enabled.

DESCRIPTION OF EMBODIMENT

With reference to drawings, an embodiment of the present invention is described below.

Figure 1:
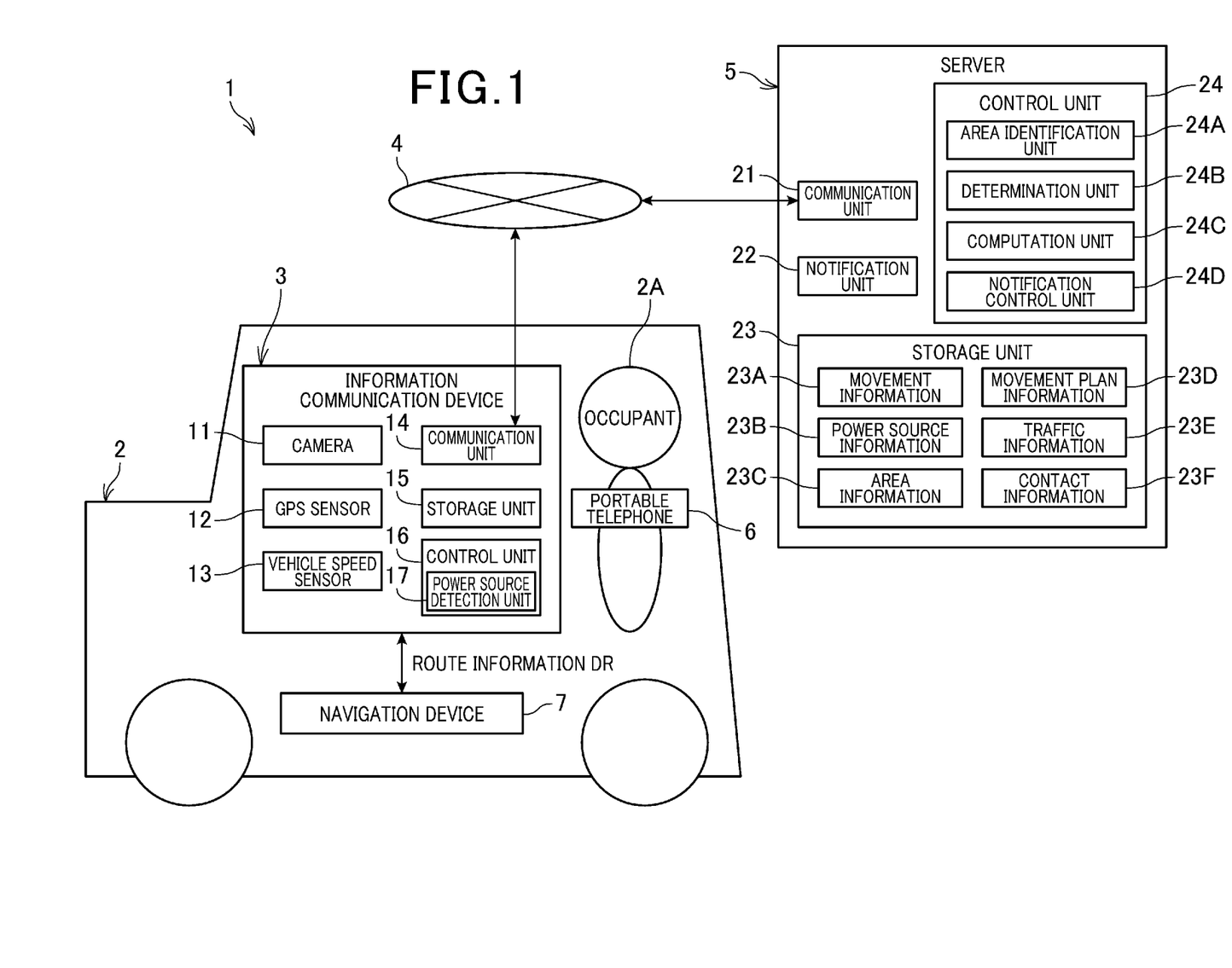
FIG. 1 is a diagram showing a configuration of a communication system according to an embodiment of the present invention.

FIG. 1 is a diagram showing a configuration of a communication system according to an embodiment of the present invention.

A communication system 1 includes an information communication device 3 mounted on a vehicle 2 and a server 5 connected to a communication network 4, and the information communication device 3 and the server 5 can perform communication over the communication network 4.

The communication network 4 includes a wireless communication network, and communication based on, for example, a publicly known communication standard defined for the Internet can be performed. Though one vehicle 2 and one information communication device 3 are shown in FIG. 1, the numbers are not limited to one.

The vehicle 2 is a vehicle that runs on a public road and, according to this embodiment, is a limousine, a taxi, a private vehicle or the like that runs on a public road with an occupant 2A thereon. FIG. 1 shows a portable telephone 6 that enables telephone communication with the occupant 2A within the vehicle 2 and a navigation device 7 mounted within the vehicle 2.

The navigation device 7 performs route guide to a destination by executing publicly known navigation processing. It can be said that a driving plan route that is a route to a destination is a movement plan route of the information communication device 3. Information on a movement plan route of the information communication device 3 can be output from the navigation device 7 to the information communication device 3 as route information DR.

For example, the route information DR may be output from the navigation device 7 to the information communication device 3 by using a publicly known communication method such as near field wireless communication or wired communication, and the output method is not particularly limited.

The present invention is not limited to the configuration in which the route information DR is output from the navigation device 7 to the information communication device 3, but the route information DR may be output to the information communication device 3 from a limousine company or a taxi company that knows a driving plan route of the vehicle 2 by using an arbitrary method.

The portable telephone 6 is a portable telephone terminal that enables telephone communication by using a public telephone network. Note that the portable telephone 6 also has a function for transmitting and receiving electronic mails, for example.

The information communication device 3 is a vehicle-mounted device having a position detection function that detects a current position and a function that communicates with the server 5, for example, and, in this embodiment, is provided in a drive recorder. More specifically, the information communication device 3 includes a camera 11 that captures images of, for example, a front view of the vehicle 2, a global positioning system (GPS) sensor 12, a vehicle speed sensor 13, a communication unit 14, a storage unit 15, and a control unit 16.

The camera 11 is an imaging device that captures images of, for example, a front view of the vehicle while running, for example. The GPS sensor 12 functions as a current-position detection sensor that detects a current position of the information communication device 3, that is, a current position of the vehicle 2 by using a GPS satellite. The vehicle speed sensor 13 detects a driving speed of the vehicle 10 (hereinafter, "vehicle speed").

The communication unit 14 includes a function that wirelessly communicates with, for example, the server 5 over the communication network 4 and a function that acquires the route information DR by communicating with the navigation device 7.

The storage unit 15 stores a control program and data captured by the camera 11 and also stores, for example, an identification ID from which the information communication device 3 can be identified.

The control unit 16 executes the control program stored in the storage unit 15 and controls the components of the information communication device 3 in accordance with the control program. Also, the control unit 16 has a power source detection unit 17 that detects an ON/OFF state of an accessory power source (hereinafter, "ACC power source") in the vehicle 2.

The control unit 16 has a computer configuration and controls the components of the information communication device 3 by executing the control program stored in the storage unit 15. Thus, the control unit 16 executes processing, such as imaging processing, that a publicly known drive recorder has and executes communication processing that transmits information on a current position and a vehicle speed detected by, for example, the sensors 12 and 13, the route information DR, and information indicating switching of the ON/OFF state of the ACC power source to the server 5 through the communication unit 14. Here, the information on a current position also includes a time of the point when the current position is detected.

The information communication device 3 includes, for example, an internal battery so that the information communication device 3 can keep operating even when the ACC power source is turned off. Thus, when the ACC power source is turned off, information indicating the turning to an OFF state can be transmitted to the server 5. Also, in the communication processing through the communication unit 14, transmission of the identification ID stored in the storage unit 15 to the server 5 allows the server 5 side to identify the information communication device 3 that is the transmission source.

Next, the server 5 is described.

The server 5 includes a communication unit 21, a notification unit 22, a storage unit 23, and a control unit 24.

The communication unit 21 functions as an information acquisition unit that acquires, for example, position information transmitted from the information communication device 3 through wireless communication with, for example, the information communication device 3 over the communication network 4. The communication unit 21 further functions as a traffic information acquisition unit that acquires the latest traffic information 23E over the communication network 4.

The notification unit 22 has a function that notifies various kinds of information to a telephone terminal including the portable telephone 6 by using a public telephone network and, more specifically, enables telephone communication using automated voice to the telephone terminal and transmission and reception of message data to and from the telephone terminal by using a short message service or an electronic mail function, for example.

The storage unit 23 stores a control program and map information including roads and stores movement information 23A on the information communication device 3, information 23B on the ACC power source (hereinafter, "power source information") for the vehicle 2 having the information communication device 3 thereon, area information 23C from which an out-of-service area in which communication with the information communication device 3 is disabled can be identified, movement plan information 23D from which a movement plan route of the information communication device 3 can be identified, traffic information 23E from which, for example, a traffic jam can be identified, and contact information 23F describing a contact of, for example, the occupant 2A on the vehicle 2.

Figure 2:
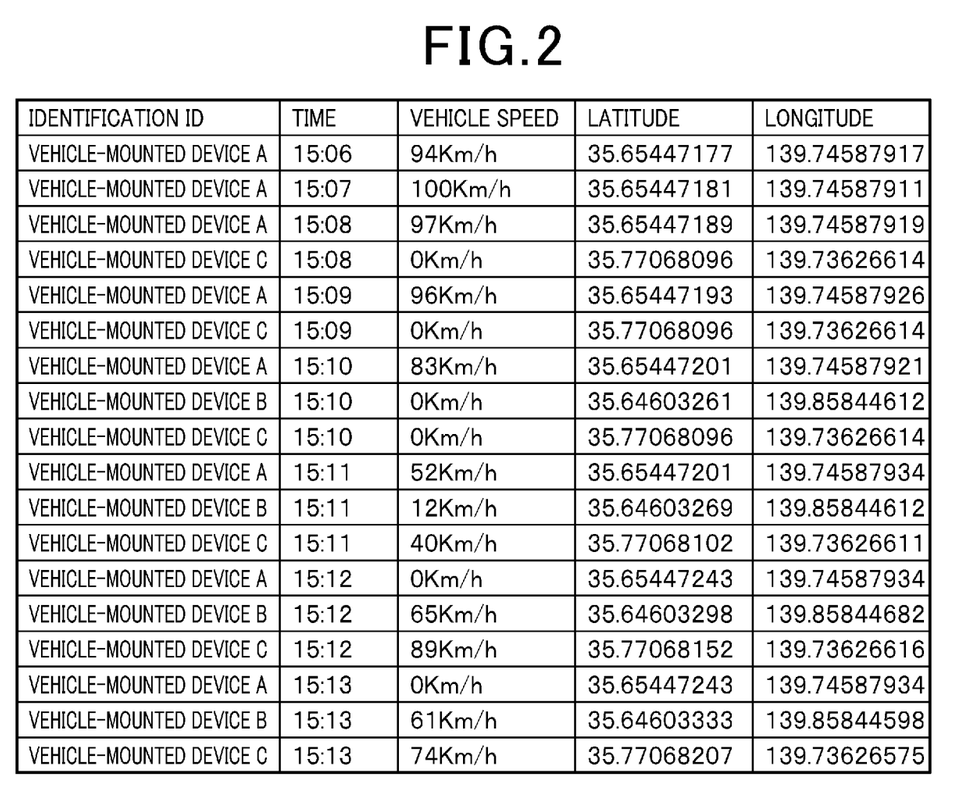
FIG. 2 is a diagram showing an example of movement information.

FIG. 2 is a diagram showing an example of the movement information 23A.

The movement information 23A is information on a movement of the information communication device 3 and information including information on a current position and a vehicle speed transmitted from the information communication device 3. FIG. 2 shows, in order of times, each of vehicle-mounted devices A to D, which are identification IDs of the information communication devices 3, in association with a latitude and longitude indicating a current position, a vehicle speed, and a time when the current position is detected in the information communication device 3 side. As shown in FIG. 2, each of the information communication devices 3 corresponding to the vehicle-mounted devices A to D transmits a time, a vehicle speed and position information to the server 5 at intervals of several minutes.

Figure 3:
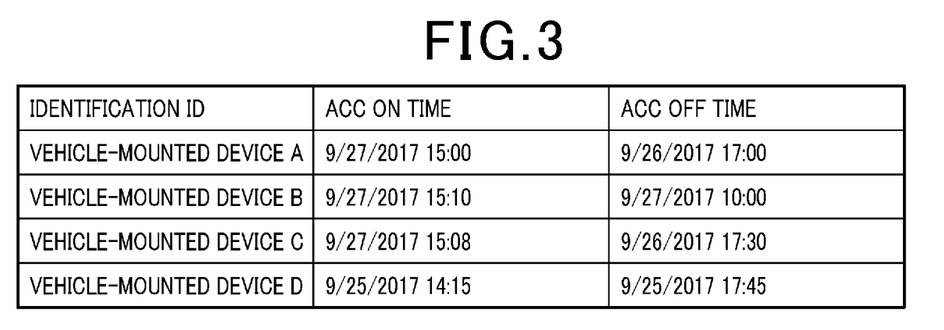
FIG. 3 is a diagram showing an example of power source information.

FIG. 3 shows an example of the power source information 23B.

The power source information 23B is information which is transmitted from the information communication device 3 and from which an ON/OFF state of the ACC power source can be identified and includes "ACC ON TIME" that is a time when the ACC power source is turned on and "ACC OFF TIME" that is a time when the ACC power source is turned off for each of the vehicle-mounted devices A to D which are identification IDs.

Referring to FIG. 3, regarding each of the vehicle-mounted devices A, B and C, because "ACC ON TIME" is a time later than "ACC OFF TIME", it can be determined that the ACC power source currently is in an ON state. On the other hand, regarding the vehicle-mounted device D, because the ACC power source is not turned on after "ACC OFF TIME", it can be determined that the ACC power source currently has an OFF state.

When the ACC power source is in an ON state, it can be regarded that the vehicle 2 is in use. When the ACC power source has an OFF state, it can be regarded that the vehicle 2 is in a nonuse state. In other words, the power source information 23B is also information indicating whether the vehicle 2, which is a mobile unit, is in a use state or not.

The area information 23C is information from which an out-of-service area such as an area where, for example, a communication service with the information communication device 3 is not executed can be identified. By using this area information 23C and, for example, based on a latitude and longitude of the information communication device 3, whether an area including the latitude and longitude is an out-of-service area or not can be determined.

The movement plan information 23D is information from which a movement plan route for each of the information communication devices 3 can be identified, and is, for example, information in which an identification ID of the information communication device 3 and route information DR are associated.

The traffic information 23E is information from which, for example, a traffic jam and an accident occurring in various places can be identified and is, for example, Vehicle Information Communication System (VICS) (registered trademark) information acquired from a traffic information provision service.

Figure 4:
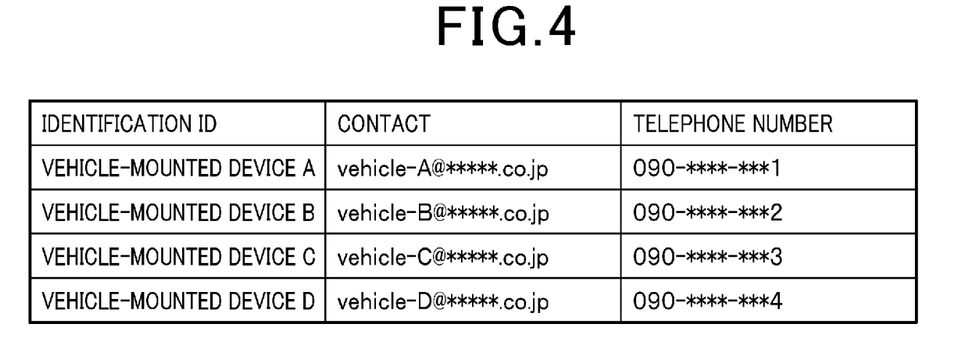
FIG. 4 is a diagram showing an example of contact information.

FIG. 4 is a diagram showing an example of the contact information 23F.

The contact information 23F is information on a contact of the information communication device 3 and is information in which an e-mail address and a telephone number are associated with each of the vehicle-mounted devices A to D, which are identification IDs, as shown in FIG. 4. The e-mail address and telephone number, in the case of, for example, the information communication device 3 shown in FIG. 1, correspond to a contact to be used for confirmation of the safety of the occupant 2A within the vehicle 2 shown in FIG. 1.

Figure 5:
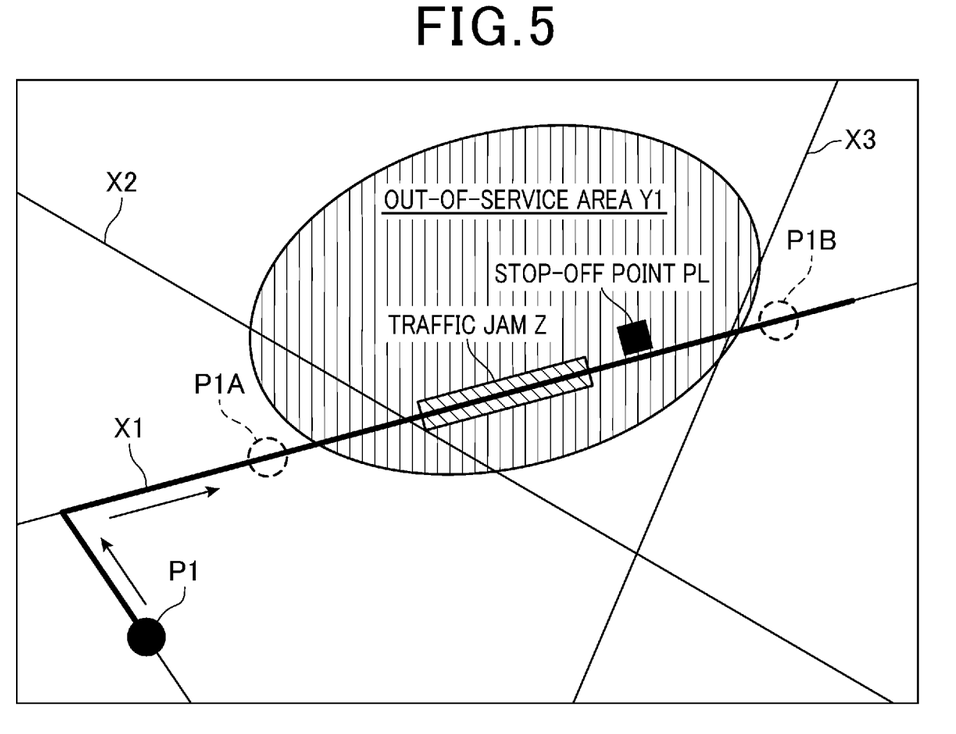
FIG. 5 is a diagram showing a current position of a vehicle and an out-of-service area along with a peripheral configuration.

Based on the information 23A to 23E stored in the storage unit 23, the control unit 24 in the server 5 can identify, for example, a current position P1A of the vehicle 2, a movement plan route X1 of the information communication device 3, an out-of-service area Y1 existing around the current position P1A, and a traffic jam Z existing around the current position P1A as illustrated in FIG. 5. FIG. 5 shows a departure position P1 of the vehicle 2, roads X2 and X3 other than the movement plan route X1, and a stop-off point PL of the vehicle 2.

The control unit 24 has a computer configuration and controls the components of the server 5 by executing the control program stored in the storage unit 23. Thus, the control unit 24 functions as an area identification unit 24A that identifies the out-of-service area Y1, a determination unit 24B that determines whether the information communication device 3 enters the out-of-service area Y1 or not, a computation unit 24C that calculates an expected stay time T1 in which the information communication device 3 stays in the out-of-service area Y1, and a notification control unit 24D that controls notification to a contact written in the contact information 23F.

Under control of the control unit 24, the server 5 performs, through the communication unit 21, information acquisition processing that acquires, for example, position information transmitted from the information communication device 3 at time intervals and information update processing that updates the movement information 23A, the power source information 23B and the movement plan information 23D based on the acquired information.

The server 5 further performs abnormality monitoring processing that determines whether any abnormality occurs in the information communication device 3 within the out-of-service area Y1 as shown in FIG. 5 or not and addresses in accordance with the determination result.

Figure 6:
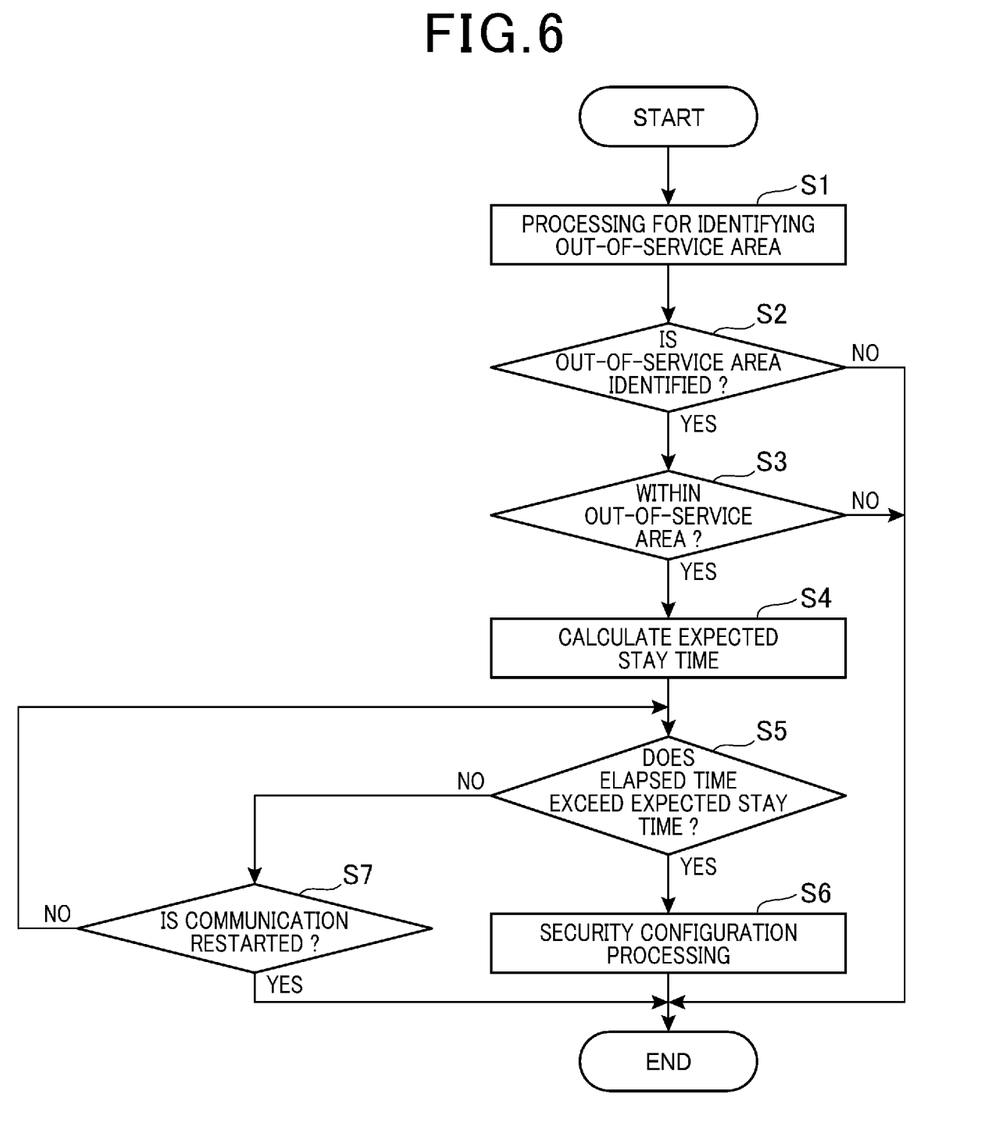
FIG. 6 is a flowchart showing abnormality monitoring processing by a server.

FIG. 6 is a flowchart showing the abnormality monitoring processing by the server 5. Note that the flow shown in FIG. 6 is repeatedly executed at predetermined timings.

For convenience of description, the flowchart is described below by using the current position P1A, the movement plan route X1, the out-of-service area Y1 existing around the current position P1A, and the traffic jam Z existing around the current position P1A shown in FIG. 5.

The abnormality monitoring processing is processing to be only performed on the information communication device 3 mounted on the vehicle 2 in which the ACC power source is in an ON state. The control unit 24 can easily determine whether the ACC power source is in an ON state or not with reference to the power source information 23B.

In step S1, the server 5 performs processing for identifying the out-of-service area Y1 through which the information communication device 3 passes by using the area identification unit 24A. In this case, the area identification unit 24A identifies the out-of-service area Y1 by using history including the latest current position P1A of the information communication device 3, the movement information 23A, the movement plan information 23D and the area information 23C.

For example, when the latest position information of the information communication device 3 is the current position P1A shown in FIG. 5, the out-of-service area Y1 can be easily identified by searching the movement plan route X1 for driving, which is within a predetermined distance range from the current position P1A and which is estimated from the movement information 23A and the movement plan information 23D.

In this manner, the use of the position information including the latest current position P1A and the movement plan route X1 allows avoidance of a situation in which the out-of-service area Y1 through which the information communication device 3 has already passed is identified as an out-of-service area through which the information communication device 3 will pass in a case where, for example, the latest position information of the information communication device 3 is a current position P1B shown in FIG. 5.

When the out-of-service area Y1 that is the nearest destination is clear based on the latest current position P1A and the movement information 23A, the out-of-service area Y1 through which the information communication device 3 will pass may be identified without using the movement plan information 23D.

The server 5 moves to the processing in step S3 if the out-of-service area Y1 can be identified by using the area identification unit 24A in step S2 or ends the flow if the out-of-service area Y1 cannot be identified.

The server 5 in step S3 determines whether the information communication device 3 is within the out-of-service area Y1 or not by using the determination unit 24B and moves to processing in step S4 if it is determined that the information communication device 3 is within the out-of-service area Y1 or ends the flow if it is determined that the information communication device 3 is not within the out-of-service area Y1. For example, when position information, for example, from the information communication device 3 is not received for a predetermined period of time or longer though the ACC power source is not turned off, the determination unit 24B determines that the information communication device 3 is within the out-of-service area Y1 identified in step S2.

In step S4, the server 5 performs calculation processing for calculating the expected stay time T1 in which the information communication device 3 stays in the out-of-service area Y1 by using the computation unit 24C.

In this case, the computation unit 24C refers to the movement information 23A and so on and, if past information indicating driving in the out-of-service area Y1 through the same movement plan route X1 exists, calculates an estimated time required for passing through the out-of-service area Y1 based on the past information and sets the expected stay time T1 based on the estimated time. In other words, the expected stay time T1 is set based on the position history of the information communication device 3 acquired through communication.

Note that the estimated time may be any one of a mean time, the nearest transit time, and a transit time at the same time of year or day in the past. The expected stay time T1 may be a time equal to the estimated time or a time longer than the estimated time by a predetermined value or may be set as required.

On the other hand, if the past information does not exist within the movement information 23A, the server 5 calculates, by using the computation unit 24C, an estimated time required for passing through the out-of-service area Y1 based on the content of the route information DR. For example, based on the movement plan route X1 identified from the route information DR, the movement distance required for passing through the out-of-service area Y1 is identified, and, in consideration of a mean speed per hour preset for the identified movement distance, an estimated time required for passing through the out-of-service area Y1 is calculated. Note that, when a stop-off point PL (see FIG. 5) is written in the route information DR, the estimated time is calculated preferably in consideration of the time required for the stop-off.

Then, based on the calculated estimated time, the expected stay time T1 is set. Also in this case, the expected stay time T1 may be a time equal to the estimated time, a time longer than the estimated time by a predetermined value or may be set as required.

For the setting of the expected stay time T1 in step S4, the computation unit 24C preferably refers to the traffic information 23E and, if a traffic jam Z is occurring within the out-of-service area Y1, sets the expected stay time T1 reflecting the traffic jam Z and, if a traffic jam Z is not occurring, sets the expected stay time T1 by determining that no traffic jam is occurring.

Also, the computation unit 24C preferably refers to the movement plan information 23D and, if stop-off to the stop-off point PL shown in FIG. 5 is planned, sets the expected stay time T1 reflecting the stop-off and, if no stop off is planned, sets the expected stay time T1 by determining that no stop-off is planned.

In step S5, the server 5 counts, by using the notification control unit 24D, an elapsed time from a time when communication is disabled from the current position P1 immediately before the out-of-service area Y1 and, if the elapsed time exceeds the expected stay time T1, moves to processing in step S6.

On the other hand, the server 5 ends the flow if the communication is restarted before the elapsed time exceeds the expected stay time T1. In other words, if the elapsed time does not exceed the expected stay time T1, it is regarded that no abnormality occurs, and security confirmation processing in step S6 is not executed.

In step S6, the server 5 performs the security confirmation processing by using the notification control unit 24D. The security confirmation processing is processing to be executed if it is determined that an abnormality such as an accident occurs within the out-of-service area Y1. According to this embodiment, as the security confirmation processing, the notification control unit 24D performs notification processing for notifying, through the notification unit 22, predetermined information for security confirmation to a contact written in the contact information 23F. The notification processing in this case may be a telephone communication using automated voice or an electronic mail.

The contact in this notification processing is not limited to the occupant 2A in the vehicle 2 but may be a family member of the occupant 2A, a manager who manages the driving of the vehicle 2 or the like, or a plurality of the contacts may be reached. For example, if the security cannot be confirmed by making contact with the occupant 2A in the vehicle 2, predetermined information may be notified to, for example, a family member of the occupant 2A. The operations of the abnormality monitoring processing by the server 5 have been described above.

As described above, because the server 5 executes the calculation processing for calculating the expected stay time T1 in which the information communication device 3 stays in the out-of-service area Y1 and the notification processing for, if it is determined that the information communication device 3 enters the out-of-service area Y1 and if the elapsed time from a time when communication with the information communication device 3 is disabled exceeds the expected stay time T1, notifying predetermined information to a notification destination, occurrence of an abnormality in the out-of-service area Y1 due to, for example, absence of communication facility can be detected with high precision, and notification to the notification destination is enabled.

For identification of the out-of-service area Y1 through which the information communication device 3 passes, position information of the information communication device 3 is used, and the area information 23C from which the out-of-service area Y1 can be identified and the movement plan information 23D from which a movement plan route of the information communication device 3 can be identified are used. Therefore, the out-of-service area Y1 through which the information communication device 3 passes can be easily identified with high precision. Having described that, according to this embodiment, both of the area information 23C and the movement plan information 23D are used, the movement plan information 23D may not be used if the out-of-service area Y1 through which the information communication device 3 passes can be identified without using the movement plan information 23D.

Because, if the elapsed time exceeds the expected stay time T1, the server 5 performs, by using the notification control unit 24D, the notification processing for confirming the security of the occupant 2A, as a security confirmation target person, moving along with the information communication device 3, the security of the security confirmation target person can be quickly confirmed when there is a possibility that an abnormality occurs in the out-of-service area Y1. Note that the notification processing is not limited to the one for the purpose of the confirmation of security but may be one for the purpose of confirmation of a situation other than the security. In other words, notification processing for confirming various situations of a monitoring target person is broadly applicable to the processing in step S6 described above.

Because the server 5 calculates the expected stay time T1 by using the computation unit 24C based on at least one of acquired position history of the information communication device 3 and a movement plan of the information communication device 3, the expected stay time T1 can be easily identified with high precision, and occurrence of an abnormality can be easily detected with high precision.

Furthermore, because the computation unit 24C sets the expected stay time T1 as a time reflecting the traffic information 23E, the expected stay time T1 can be easily set with higher precision.

Because the abnormality monitoring processing described above is processing to be performed only on the information communication device 3 mounted on the vehicle 2 for which the ACC power source is in an ON state based on the power source information 23B, the notification processing for confirming the security is not executed if it is regarded, based on the power source information 23B, that the vehicle 2 is in a nonuse state. Thus, a situation can be avoided in which it is falsely detected that an abnormality occurs and the notification processing is performed when the vehicle 2 is in a nonuse state.

The aforementioned embodiment only illustrates an aspect of the present invention, and changes and applications can be arbitrarily made without departing from the scope of the present invention.

For example, the aforementioned constituent elements of, for example, the information communication device 3 and the server 5 may be divided or may be integrated. The constituent elements can be arbitrarily implemented by, for example, cooperation of hardware and software. Also, regarding the flowchart, the processing corresponding to each of the steps may be divided or may be integrated.

Having described that, according to the aforementioned embodiment, the present invention is applied to the server 5 that communicates with the information communication device 3 mounted on the vehicle 2 and the communication system 1, the present invention is not limited thereto. For example, the present invention may be applied to the server 5 that communicates with the information communication device 3 moving along with a mobile unit such as a bicycle other than the vehicle 2 and the communication system 1.

REFERENCE SIGNS LIST

1 communication system
2 vehicle (mobile unit)
2A occupant (monitoring target person)
3 information communication device
4 communication network
5 server
6 portable telephone (telephone terminal)
7 navigation device
11 camera
12 GPS sensor
13 vehicle speed sensor
14 communication unit
15, 23 storage unit
16, 24 control unit
17 power source detection unit
21 communication unit (information acquisition unit, traffic information acquisition unit)
22 notification unit
23A movement information
23B power source information
23C area information
23D movement plan information
23E traffic information
23F contact information
24A area identification unit
24B determination unit
24C computation unit
24D notification control unit
DR route information
P1, P1A, P1B vehicle position (position of information communication device)
PL stop-off point
T1 expected stay time
X1 movement plan route
Y1 out-of-service area
Z traffic jam

The invention claimed is:

1. A server comprising:
a computer including an information acquisition unit acquiring position information of an information communication device at time intervals through communication with the information communication device,
wherein the computer includes:
an area identification unit identifying an out-of-service area in which communication with the information communication device is disabled;
a determination unit determining whether the information communication device enters the out-of-service area or not by using the position information;
a computation unit calculating an expected stay time in which the information communication device stays in the out-of-service area; and
a notification control unit executing notification processing for notifying predetermined information to a notification destination if it is determined that the information communication device enters the out-of-service area and when an elapsed time from a time when communication with the information communication device is disabled exceeds the expected stay time,
wherein the information acquisition unit further acquires information indicating whether a mobile unit moving along with the information communication device is in a use state or not, and
the notification control unit does not execute the notification processing if it is regarded, based on the information indicating whether the mobile unit is in a use state or not, that the mobile unit is in a nonuse state.

2. The server according to claim 1, wherein the area identification unit identifies an out-of-service area through which the information communication device passes by using the position information and by using area information from which the out-of-service area can be identified and information from which a movement plan route of the information communication device can be identified.

3. The server according to claim 1, wherein the notification control unit performs notification processing for confirming a situation of a monitoring target person moving along with the information communication device if the elapsed time exceeds the expected stay time.

4. The server according to claim 1, wherein the computation unit calculates the expected stay time based on at least one of acquired position history of the information communication device and a movement plan of the information communication device.

5. The server according to claim 1, wherein the computer further comprises
a traffic information acquisition unit acquiring traffic information including a traffic jam,
wherein the computation unit sets the expected stay time as a time reflecting the traffic information.

6. A communication system comprising:
an information communication device and a server,
wherein the server includes a computer having an information acquisition unit acquiring position information of the information communication device at time intervals through communication with the information communication device,
wherein the computer includes
an area identification unit identifying an out-of-service area in which communication with the information communication device is disabled;
a determination unit determining whether the information communication device enters the out-of-service area or not by using the position information;
a computation unit calculating an expected stay time in which the information communication device stays in the out-of-service area; and
a notification control unit executing notification processing for notifying predetermined information to a notification destination if it is determined that the information communication device enters the out-of-service area and when an elapsed time from a time when communication with the information communication device is disabled exceeds the expected stay time,
wherein the information acquisition unit further acquires information indicating whether a mobile unit moving along with the information communication device is in a use state or not, and
the notification control unit does not execute the notification processing if it is regarded, based on the information indicating whether the mobile unit is in a use state or not, that the mobile unit is in a nonuse state.

7. The communication system according to claim 6, wherein the area identification unit identifies an out-of-service area through which the information communication device passes by using the position information and by using area information from which the out-of-service area can be identified and information from which a movement plan route of the information communication device can be identified.

8. The communication system according to claim 6, wherein the notification control unit performs notification processing for confirming a situation of a monitoring target person moving along with the information communication device if the elapsed time exceeds the expected stay time.

9. The communication system according to claim 6, wherein the computation unit calculates the expected stay time based on at least one of acquired position history of the information communication device and a movement plan of the information communication device.

10. The communication system according to claim 6, wherein
- the computer further includes a traffic information acquisition unit acquiring traffic information including a traffic jam, and
- the computation unit sets the expected stay time as a time reflecting the traffic information.

\* \* \* \* \*